US009357297B2

(12) United States Patent
Li

(10) Patent No.: US 9,357,297 B2
(45) Date of Patent: May 31, 2016

(54) AUDIO SIGNAL ADAPTER DEVICE AND SYSTEM FOR TRANSMITTING AUDIO SIGNAL

(75) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 220 days.

(21) Appl. No.: 14/233,422

(22) PCT Filed: Jul. 18, 2012

(86) PCT No.: PCT/CN2012/078834

§ 371 (c)(1),
(2), (4) Date: Mar. 12, 2014

(87) PCT Pub. No.: WO2013/010487

PCT Pub. Date: Jan. 24, 2013

(65) Prior Publication Data

US 2015/0036837 A1 Feb. 5, 2015

(30) Foreign Application Priority Data

Jul. 18, 2011 (CN) .......................... 2011 1 0201205

(51) Int. Cl.
*H04B 3/00* (2006.01)
*H04R 3/00* (2006.01)
*H04R 5/04* (2006.01)

(52) U.S. Cl.
CPC .. *H04R 3/00* (2013.01); *H04R 5/04* (2013.01); *H04R 2420/09* (2013.01)

(58) Field of Classification Search
CPC ............. H04R 5/033; H04R 5/04; H04R 3/00
USPC ........................... 381/77, 120, 58, 74; 700/94
See application file for complete search history.

(56) References Cited

U.S. PATENT DOCUMENTS 8,064,613 B1 * 11/2011 Helfrich ................... H04R 5/04 381/113
8,868,816 B2 * 10/2014 Kim .................... G06F 13/4022 381/74
2012/0328116 A1 * 12/2012 Bidmead .............. H04R 29/004 381/59
2013/0343552 A1 * 12/2013 Xiao .................... H04R 29/008 381/58

* cited by examiner

*Primary Examiner* — Disler Paul
(74) *Attorney, Agent, or Firm* — Maginot, Moore & Beck, LLP

(57) ABSTRACT

An audio signal adapter device and a system for transmitting an audio signal are provided. The audio signal adapter device comprises: a microphone, configured to receive the audio signal and to output the audio signal via an audio pin thereof; an amplifying unit configured to amplify the audio signal received via an audio input pin thereof and to output an amplified audio signal via an audio output pin thereof; and a USB adapter interface, connected with an audio signal receiving device and comprises an audio signal pin. The audio pin of the microphone is connected with the audio input pin of the amplifying unit, and the audio output pin of the amplifying unit is connected with the audio signal pin of the USB adapter interface.

6 Claims, 3 Drawing Sheets

AUDIO SIGNAL ADAPTER DEVICE AND SYSTEM FOR TRANSMITTING AUDIO SIGNAL

FIELD

The present disclosure generally relates to an electronic technical field, and more particularly relates to an audio signal adapter device and a system for transmitting an audio signal.

BACKGROUND

With the development of an audio signal coding/decoding technology, more and more electronic equipments transmitting data via an audio interface are produced. For example, the electronic equipment may be connected with a mobile communication device (such as a mobile phone) via a loudspeaker interface (such as a headphone interface) of the mobile communication device for receiving an audio signal output from the mobile communication device, and can also receive the audio signal output from a loudspeaker of the mobile communication device or a loudspeaker of a fixed telephone device via a microphone (MIC).

Furthermore, with the popularization of a USB interface, a large number of electronic equipments are provided with the USB interface. Thus, how to receive the audio signal output from the loudspeaker of the mobile communication device or the loudspeaker of the fixed telephone device via the USB interface of the electronic equipment is a technical problem which needs to be solved currently.

SUMMARY

The present disclosure provides an audio signal adapter device which can output an audio signal output from a loudspeaker to an electronic equipment via a USB interface and a corresponding audio signal receiving device.

The present disclosure provides a system for transmitting an audio signal. The system is configured to receive the audio signal, and the system comprises an audio signal adapter device and an audio signal receiving device. The audio signal adapter device comprises a microphone, an amplifying unit and a USB adapter interface. The microphone is configured to receive the audio signal and to output the audio signal via an audio pin of the microphone. The amplifying unit comprises an audio input pin and an audio output pin, and is configured to amplify the audio signal received via the audio input pin and to output an amplified audio signal via the audio output pin. The USB adapter interface is connected with the audio signal receiving device and comprises an audio signal pin. The audio pin of the microphone is connected with the audio input pin of the amplifying unit, and the audio output pin of the amplifying unit is connected with the audio signal pin of the USB adapter interface. The audio signal receiving device comprises a USB interface and an audio receiving module. The USB interface comprises an audio signal pin, and the audio signal pin of the USB interface is connected with the audio signal pin of the USB adapter interface. The audio receiving module is connected with the audio signal pin of the USB interface, and configured to receive the audio signal via the audio signal pin of the USB interface. The audio signal pin of the USB adapter interface is one of a D+ pin and a D− pin of the USB adapter interface, and the audio signal pin of the USB interface is one of a D+ pin and a D-pin of the USB interface.

Furthermore, the microphone further comprises a ground pin, the amplifying unit further comprises a ground pin, and each of the USB adapter interface and the USB interface further comprises a reference signal pin. The reference signal pin of the USB adapter interface is connected with the ground pin of the microphone and/or the ground pin of the amplifying unit. The reference signal pin of the USB adapter interface is the other one of the D+ pin and the D− pin of the USB adapter interface, and the reference signal pin of the USB interface is the other one of the D+ pin and the D− pin of the USB interface.

Furthermore, the audio receiving module comprises a first comparator. A positive terminal of the first comparator is connected with the audio signal pin of the USB interface, a negative terminal of the first comparator is connected with the reference signal pin of the USB interface, and an output pin of the first comparator is configured to output a square wave corresponding to an input audio signal; or the positive terminal of the first comparator is connected with the reference signal pin of the USB interface, the negative terminal of the first comparator is connected with the audio signal pin of the USB interface, and the output pin of the first comparator is configured to output the square wave corresponding to the input audio signal.

Furthermore, the audio receiving module comprises a direct current signal isolation unit, a first direct current bias unit, a second direct current bias unit and a second comparator. The direct current signal isolation unit has an input end connected with the audio signal pin of the USB interface and an output end connected with the second direct current bias unit, and is configured to isolate a direct current level in the audio signal received via the audio signal pin of the USB interface to obtain a processed audio signal and to output the processed audio signal via the output end of the direct current signal isolation unit. The second direct current bias unit has an input end connected with the direct current signal isolation unit and an output end connected with a negative terminal of the second comparator, and is configured to add a direct current bias to the audio signal input from the input end of the second direct current bias unit to obtain a biased audio signal and to output the biased audio signal via the output end of the second direct current bias unit. The first direct current bias unit has an output end connected with a positive terminal of the second comparator, and is configured to output a reference level. The second comparator is configured to output a square wave corresponding to the audio signal via an output terminal of the second comparator under an action of the reference level input from the positive terminal of the second comparator and the biased audio signal input from the negative terminal of the second comparator.

Furthermore, the output terminal of the second comparator is connected with the positive terminal of the second comparator via a resistor R7 and is connected with a pull-up resistor R8.

Furthermore, the first direct current bias unit comprises a resistor (R3) and a resistor (R4). A first terminal of the resistor (R3) is connected with a first power supply, and a second terminal of the resistor (R3) is connected with the resistor (R4). A first terminal of the resistor (R4) is connected with the resistor (R3) and the output end of the first direct current bias unit respectively, and a second terminal of the resistor (R4) is grounded. The second direct current bias unit comprises a resistor (R5) and a resistor (R6). A first terminal of the resistor (R5) is connected with a second power supply, and a second terminal of the resistor (R5) is connected with the resistor (R6). A first terminal of the resistor (R6) is connected with the resistor (R5) and the output end of the second direct current bias unit respectively, and a second terminal of the resistor (R6) is grounded. An output voltage of the first power supply is equal to the output voltage of the second power supply, a resistance of the resistor (R3) is equal to a resistance of the resistor (R5), and a resistance of the resistor (R4) is equal to a resistance of the resistor (R6).

The present disclosure further provides an audio signal adapter device. The audio signal adapter device comprises a microphone. The device further comprises an amplifying unit and a USB adapter interface. The microphone is configured to receive an audio signal and to output the audio signal via an audio pin of the microphone. The amplifying unit comprises an audio input pin and an audio output pin, and is configured to amplify the audio signal received via the audio input pin and to output an amplified audio signal via the audio output pin. The USB adapter interface is connected with an audio signal receiving device and comprises an audio signal pin. The audio pin of the microphone is connected with the audio input pin of the amplifying unit, and the audio output pin of the amplifying unit is connected with the audio signal pin of the USB adapter interface. The audio signal pin of the USB adapter interface is one of a D+ pin and a D− pin of the USB adapter interface.

Furthermore, the microphone further comprises a ground pin, the amplifying unit further comprises a ground pin, and the USB adapter interface further comprises a reference signal pin. The reference signal pin of the USB adapter interface is connected with the ground pin of the microphone and/or the ground pin of the amplifying unit. The reference signal pin of the USB adapter interface is the other one of the D+ pin and the D− pin of the USB adapter interface.

In conclusion, in the present disclosure, the electronic equipment (the audio signal receiving device) can receive the audio signal output from a loudspeaker via the USB interface with a relatively low hardware cost. When it is used in combination with the audio signal adapter device (e.g., an audio cable) of the present disclosure, the electronic equipment can receive the audio signal output from the loudspeaker via the USB interface, without the need of providing a separate loudspeaker interface, and without the need of providing an MIC functional module, thus reducing a cost of the electronic equipment and decreasing a size of the electronic equipment.

BRIEF DESCRIPTION OF THE DRAWINGS

In order to explicitly illustrate a technical solution of embodiments of the present disclosure, a brief introduction for the accompanying drawings corresponding to the embodiments will be listed as follows. Apparently, the drawings described below are only corresponding to some embodiments of the present disclosure, and those skilled in the art may obtain other drawings according to these drawings without creative labor.

DETAILED DESCRIPTION

The present disclosure will be described below in detail with reference to drawings and embodiments. Apparently, the described embodiments are only some embodiments of the present disclosure rather than all the embodiments. Other embodiments obtained by those skilled in the art based on the described embodiments without creative labor fall into the scope of the present disclosure.

The present disclosure will be described in detail with reference to drawings and embodiments as follows.

The audio signal adapter device in the present disclosure may be an audio cable, an audio adapter cable, an audio adapter, etc.

First Embodiment

Figure 1:
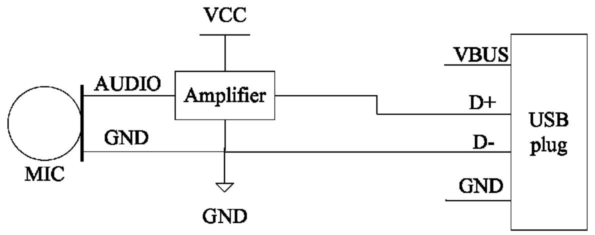
FIG. 1 is a schematic diagram of an audio signal adapter device according to a first embodiment of the present disclosure.

FIG. 1 is a schematic diagram of an audio signal adapter device according to the first embodiment of the present disclosure. As shown in FIG. 1, the audio signal adapter device comprises a microphone (MIC), an amplifying unit (such as an amplifier shown in FIG. 1) and a USB adapter interface (such as a USB plug shown in FIG. 1).

The microphone (MIC) is configured to receive an audio signal broadcast by (output from) a loudspeaker of an audio signal sending device (e.g., a mobile phone or a fixed telephone).

The MIC comprises the following pins: an audio pin (such as an AUDIO pin shown in FIG. 1) and a ground (GND) pin.

The audio pin of the MIC is configured to output the audio signal, and the ground pin of the MIC is grounded.

The amplifier is configured to amplify a received audio signal and to output an amplified audio signal.

The amplifier comprises the following pins: an audio input pin, an audio output pin, a power input pin (VCC) and a ground (GND) pin.

The audio input pin of the amplifier is connected with the audio pin of the MIC, and configured to receive the audio signal output from the audio pin of the MIC.

The audio output pin of the amplifier is configured to output the amplified audio signal.

The power input pin of the amplifier is connected with a power supply, and the ground pin of the amplifier is grounded.

Furthermore, the ground pin of the MIC may also be connected with the ground pin of the amplifier.

The USB plug is configured to be connected with a USB socket of an audio signal receiving device and to output the audio signal to the audio signal receiving device.

The USB plug comprises a power pin (a VBUS pin), a D+ pin, a D− pin and a ground pin.

In this embodiment, the audio output pin of the amplifier is connected with the D+ pin of the USB plug, and the ground pin of the MIC and/or the ground pin of the amplifier are connected with the D− pin of the USB plug. In other words, in this embodiment, the audio signal adapter device uses the D+ pin of the USB plug as an audio signal pin and uses the D− pin as a reference signal pin, so as to output the audio signal to the audio signal receiving device in differential manner.

In one embodiment of the present disclosure, the audio signal pin of the USB adapter interface is one of the D+ pin and the D− pin, and the reference signal pin of the USB adapter interface is the other one of the D+ pin and the D− pin. An audio signal pin of a USB interface is one of a D+ pin and a D− pin of the USB interface, and a reference signal pin of the USB interface is the other one of the D+ pin and the D− pin of the USB interface.

When the audio signal adapter device according to the first embodiment of the present disclosure is used in combination with the electronic equipment (the audio signal receiving device), the MIC of the audio signal adapter device can be disposed close to the loudspeaker of the audio signal sending device (e.g., the mobile phone or the fixed telephone) for receiving the audio signal broadcast by the loudspeaker, the USB plug/socket of the audio signal adapter device is connected with the USB socket/plug of the electronic equipment, and the audio signal adapter device uses the D+ pin of the plug/socket (collectively referred to as the USB adapter interface) as the audio signal pin and uses the D− pin as the reference signal pin, so as to amplify the audio signal received by the MIC and send the amplified audio signal to the electronic equipment (the audio signal receiving device) connected with the audio signal adapter device.

Figure 2:
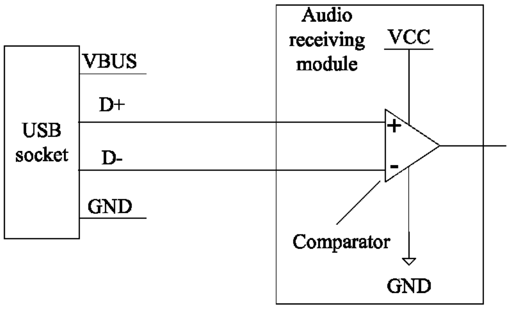
FIG. 2 is a schematic diagram of an audio signal receiving device according to the first embodiment of the present disclosure.

FIG. 2 is a schematic diagram of an audio signal receiving device according to the first embodiment of the present disclosure. As shown in FIG. 2, the audio signal receiving device comprises a USB interface (such as a USB socket shown in FIG. 2) and an audio receiving module.

The USB socket is configured to be connected with the USB plug of the audio signal adapter device, and to receive the audio signal output from the audio signal adapter device.

The USB socket comprises a power pin (a VBUS pin), a D+ pin, a D− pin and a ground pin.

The audio receiving module is connected with the D+ pin and the D− pin of the USB socket respectively, and configured to use the D+ pin of the USB socket as an audio signal pin and use the D− pin as a reference signal pin, so as to receive the audio signal transmitted via the D+ pin and the D− pin.

In this embodiment, the audio receiving module comprises a comparator, a positive terminal of the comparator is connected with the D+ pin, a negative terminal of the comparator is connected with the D− pin, a ground pin of the comparator is grounded, a power pin of the comparator is connected with a power supply, and an output pin of the comparator is configured to output a square wave corresponding to the input audio signal.

Furthermore, alternatively, the positive terminal of the comparator may be connected with the D− pin, while the negative terminal of the comparator may be connected with the D+ pin.

The system for transmitting the audio signal according to the first embodiment of the present disclosure comprises the above audio signal adapter device and the above audio signal receiving device.

Second Embodiment

Figure 3:
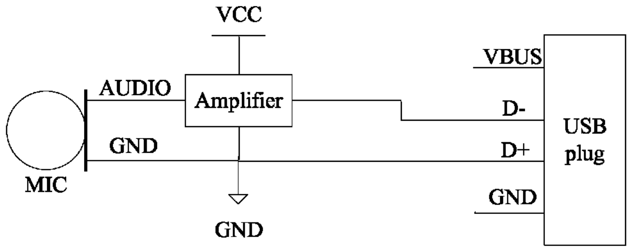
FIG. 3 is a schematic diagram of an audio signal adapter device according to a second embodiment of the present disclosure.

FIG. 3 is a schematic diagram of an audio signal adapter device according to the second embodiment of the present disclosure. As shown in FIG. 3, the differences between the audio signal adapter device in the second embodiment and that in the first embodiment are as follows.

In the second embodiment, the audio signal adapter device uses the D− pin of the USB plug as the audio signal pin for connecting with the audio output pin of the amplifier, and uses the D+ pin as the reference signal pin for connecting with the ground pin of the MIC and/or the ground pin of the amplifier, so as to output the audio signal to the audio signal receiving device.

The audio signal receiving device in the second embodiment is the same as that in the first embodiment.

The system for transmitting the audio signal according to the second embodiment of the present disclosure comprises the above audio signal adapter device and the above audio signal receiving device.

Third Embodiment

Figure 4:
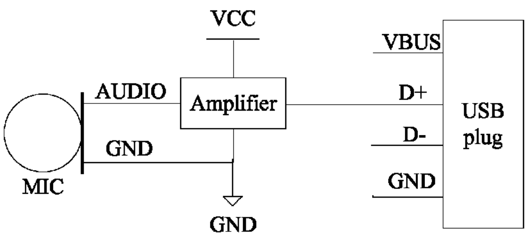
FIG. 4 is a schematic diagram of an audio signal adapter device according to a third embodiment of the present disclosure.

FIG. 4 is a schematic diagram of an audio signal adapter device according to the third embodiment of the present disclosure. As shown in FIG. 4, the differences between the audio signal adapter device in the third embodiment and that in the first embodiment are as follows.

In the third embodiment, only the audio output pin of the amplifier is connected with the D+ pin of the USB plug, the ground pin of the MIC and the ground pin of the amplifier are not needed to connect with the D− pin of the USB plug. In other words, in this embodiment, the audio signal adapter device uses the D+ pin of the USB plug as the audio signal pin, so as to output the audio signal to the audio signal receiving device in non-differential manner.

Figure 5:
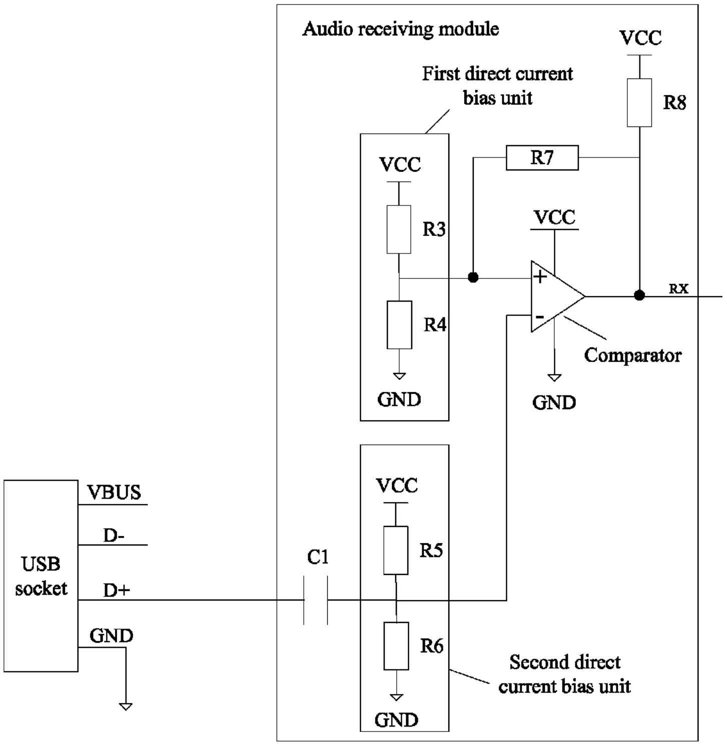
FIG. 5 is a schematic diagram of an audio signal receiving device according to the third embodiment of the present disclosure.

FIG. 5 is a schematic diagram of an audio signal receiving device according to the third embodiment of the present disclosure. As shown in FIG. 5, the audio signal receiving device comprises a USB interface (such as a USB socket shown in FIG. 5) and an audio receiving module.

The USB socket is configured to be connected with the USB plug of the audio signal adapter device and to receive the audio signal output from the audio signal adapter device.

The USB socket comprises a power pin (a VBUS pin), a D+ pin, a D− pin and a ground pin.

An input end of the audio receiving module is connected with the audio signal pin (the D+ pin), and the audio receiving module is configured to receive the audio signal via the audio signal pin (the D+ pin) and to output the audio signal via the output end of the audio receiving module.

The audio receiving module comprises a direct current signal isolation unit, a first direct current bias unit, a second direct current bias unit and a comparator.

In this embodiment, the direct current signal isolation unit comprises a capacitor C1 for isolating a direct current level. A first terminal of the capacitor C1 (an input end of the direct current signal isolation unit) is connected with the audio signal pin, and a second terminal of the capacitor C1 (an output end of the direct current signal isolation unit) is connected with the second direct current bias unit.

A capacitance of the capacitor C1 may be 0.1 μF.

An output end of the first direct current bias unit is connected with a positive terminal of the comparator, and configured to output a reference level to the comparator.

In this embodiment, the first direct current bias unit comprises a resistor R3 and a resistor R4. A first terminal of the resistor R3 is connected with a first power supply, and a second terminal of the resistor R3 is connected with the resistor R4. A first terminal of the resistor R4 is connected with the resistor R3 and the output end of the first direct current bias unit respectively, and a second terminal of the resistor R4 is grounded.

An input end of the second direct current bias unit is connected with the output end of the direct current signal isolation unit, and an output end of the second direct current bias unit is connected with a negative terminal of the comparator. The second direct current bias unit is configured to add a direct current bias to the audio signal input from the input end of the second direct current bias unit to obtain a biased audio signal so as to raise a minimum voltage of the audio signal to over 0V, and to output the biased audio signal via the output end of the second direct current bias unit.

In this embodiment, the second direct current bias unit comprises a resistor R5 and a resistor R6. A first terminal of the resistor R5 is connected with a second power supply, and a second terminal of the resistor R5 is connected with the resistor R6. A first terminal of the resistor R6 is connected with the input end of the second direct current bias unit, the resistor R5 and the output end of the second direct current bias unit respectively, and a second terminal of the resistor R6 is grounded.

An output voltage of the first power supply in the first direct current bias unit is equal to an output voltage of the second power supply in the second direct current bias unit, a resistance of the resistor R3 is equal to a resistance of the resistor R5, and a resistance of the resistor R4 is equal to a resistance of the resistor R6.

In this embodiment, each of the resistances of the resistor R3 and the resistor R5 may be 150 KΩ, and each of the resistances of the resistor R4 and the resistor R6 may be 15 KΩ.

As described above, the positive terminal of the comparator is connected with the output end of the first direct current bias unit, the negative terminal of the comparator is connected with the output end of the second direct current bias unit, and an output terminal of the comparator is connected with the output end of the audio receiving module (i.e., used as the output end of the audio receiving module) for outputting a square wave corresponding to the audio signal.

In this embodiment, in order to ensure that the comparator outputs a stable signal, the output terminal of the comparator is connected with the positive terminal of the comparator via a resistor R7 to form a loop, and the output terminal of the comparator is also connected with a pull-up resistor R8.

A resistance of the resistor R7 may be 1.5 MΩ, and a resistance of the resistor R8 may be 20 KΩ.

The system for transmitting the audio signal according to the third embodiment of the present disclosure comprises the above audio signal adapter device and the above audio signal receiving device.

Fourth Embodiment

Figure 6:
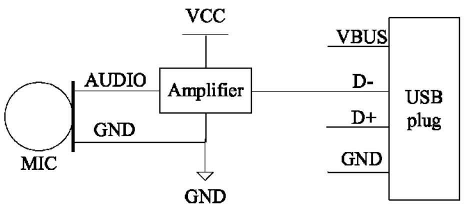
FIG. 6 is a schematic diagram of an audio signal adapter device according to a fourth embodiment of the present disclosure.

FIG. 6 is a schematic diagram of an audio signal adapter device according to the fourth embodiment of the present disclosure. As shown in FIG. 6, the differences between the audio signal adapter device in the fourth embodiment and that in the third embodiment are as follows.

In the fourth embodiment, the audio signal adapter device uses the D− pin of the USB plug as the audio signal pin for connecting with the audio output pin of the amplifier, so as to output the audio signal to the audio signal receiving device.

Figure 7:
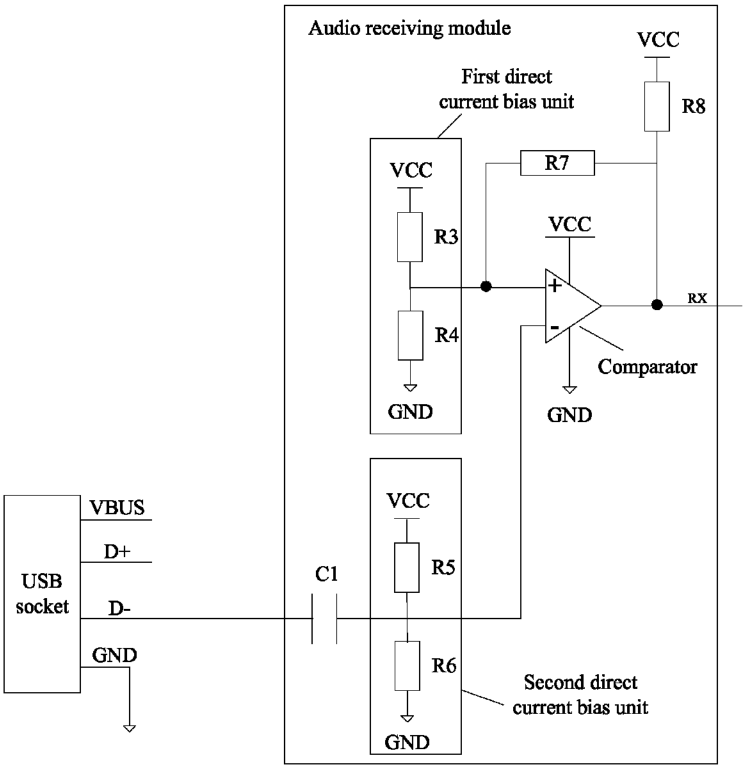
FIG. 7 is a schematic diagram of an audio signal receiving device according to the fourth embodiment of the present disclosure.

FIG. 7 is a schematic diagram of an audio signal receiving device according to the fourth embodiment of the present disclosure. As shown in FIG. 7, the differences between the audio signal receiving device in the fourth embodiment and that in the third embodiment are as follows.

In the fourth embodiment, the input end of the audio receiving module is connected with the D− pin, and the audio receiving module is configured to receive the audio signal via the D− pin and to output the audio signal via the output end of the audio receiving module.

The system for transmitting the audio signal according to the fourth embodiment of the present disclosure comprises the above audio signal adapter device and the above audio signal receiving device.

In conclusion, in the present disclosure, the electronic equipment (the audio signal receiving device) can receive the audio signal output from a loudspeaker via the USB interface with a relatively low hardware cost. When it is used in combination with the audio signal adapter device (e.g., an audio cable) of the present disclosure, the electronic equipment can receive the audio signal output from the loudspeaker via the USB interface, without the need of providing a separate loudspeaker interface, and without the need of providing an MIC functional module, thus reducing a cost of the electronic equipment and decreasing a size of the electronic equipment.

The above embodiments described with reference to drawings are exemplary and are only used to illustrate the present disclosure, but not used to limit the present disclosure. Instead, embodiments of the present disclosure include all the variations, alternates and equivalents falling in the spirit and scope of the appended claims.

In the description of the present disclosure, terms of "first" and "second" are only used for description and cannot be seen as indicating or implying relative importance. Unless otherwise specified and restricted, it is to be explained that terms of "connected" and "connection" shall be understood broadly, for example, could be permanent connection, detachable connection or integral connection; could be mechanical connection or electrical connection; could be direct connection or indirect connection via intervening structures. Those of ordinary skill in the art shall understand the concrete notations of the terms mentioned above according to specific circumstances. Furthermore, unless otherwise stated, "a plurality" refers to two or more.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

The described embodiments are only advantageous embodiments of the present disclosure, and the scope of the present disclosure is not limited to this. Changes or alternates obtained by those skilled in the art without creative labor fall into the scope of the present disclosure. Thus, the scope of the present disclosure is defined by the scope of the claims.

What is claimed is:

1. A system for transmitting an audio signal, configured to receive the audio signal, and comprising an audio signal adapter device and an audio signal receiving device, wherein the audio signal adapter device comprises a microphone, an amplifying unit and a USB adapter interface;

the microphone is configured to receive the audio signal and to output the audio signal via an audio pin of the microphone;

the amplifying unit comprises an audio input pin and an audio output pin, and is configured to amplify the audio signal received via the audio input pin and to output an amplified audio signal via the audio output pin;

the USB adapter interface is connected with the audio signal receiving device and comprises an audio signal pin;

the audio pin of the microphone is connected with the audio input pin of the amplifying unit, and the audio output pin of the amplifying unit is connected with the audio signal pin of the USB adapter interface;

the audio signal receiving device comprises a USB interface and an audio receiving module;

the USB interface comprises an audio signal pin, and the audio signal pin of the USB interface is connected with the audio signal pin of the USB adapter interface;

the audio receiving module is connected with the audio signal pin of the USB interface, and configured to receive the audio signal via the audio signal pin of the USB interface; and the audio signal pin of the USB adapter interface is one of a D+ pin and a D− pin of the USB adapter interface, and the audio signal pin of the USB interface is one of a D+ pin and a D− pin of the USB interface;

wherein;

the microphone further includes a ground pin;

the amplifying unit further includes a ground pin;

each of the USB adapter interface and the USB interface further includes a reference signal pin;

the reference signal pin of the USB adapter interface is connected with the ground pin of the microphone and/or the ground pin of the amplifying unit; and the reference signal pin of the USB adapter interface is the other one of the D+ pin and the D− pin of the USB adapter interface, and the reference signal pin of the USB interface is the other one of the D+ pin and the D− pin of the USB interface.

2. The system according to claim 1, wherein the audio receiving module comprises a comparator;

a positive terminal of the comparator is connected with the audio signal pin of the USB interface, a negative terminal of the comparator is connected with the reference signal pin of the USB interface, and an output pin of the comparator is configured to output a square wave corresponding to an input audio signal; or the positive terminal of the comparator is connected with the reference signal pin of the USB interface, the negative terminal of the comparator is connected with the audio signal pin of the USB interface, and the output pin of the comparator is configured to output the square wave corresponding to the input audio signal.

3. The system according to claim 1, wherein the audio receiving module comprises a direct current signal isolation unit, a first direct current bias unit, a second direct current bias unit and a comparator;

the direct current signal isolation unit has an input end connected with the audio signal pin of the USB interface and an output end connected with the second direct current bias unit, and is configured to isolate a direct current level in the audio signal received via the audio signal pin of the USB interface to obtain a processed audio signal and to output the processed audio signal via the output end of the direct current signal isolation unit;

the second direct current bias unit has an input end connected with the direct current signal isolation unit and an output end connected with a negative terminal of the comparator, and is configured to add a direct current bias to the processed audio signal input from the input end of the second direct current bias unit to obtain a biased audio signal and to output the biased audio signal via the output end of the second direct current bias unit;

the first direct current bias unit has an output end connected with a positive terminal of the comparator, and is configured to output a reference level; and the comparator is configured to output a square wave corresponding to the audio signal via an output terminal of the comparator under an action of the reference level input from the positive terminal of the comparator and the biased audio signal input from the negative terminal of the comparator.

4. The system according to claim 3, wherein the output terminal of the comparator is connected with the positive terminal of the comparator via a resistor R7 and is connected with a pull-up resistor R8.

5. The system according to claim 3, wherein the first direct current bias unit comprises a resistor R3 and a resistor R4;

a first terminal of the resistor R3 is connected with a first power supply, and a second terminal of the resistor R3 is connected with the resistor R4;

a first terminal of the resistor R4 is connected with the resistor R3 and the output end of the first direct current bias unit respectively, and a second terminal of the resistor R4 is grounded;

the second direct current bias unit comprises a resistor R5 and a resistor R6;

a first terminal of the resistor R5 is connected with a second power supply, and a second terminal of the resistor R5 is connected with the resistor R6;

a first terminal of the resistor R6 is connected with the resistor R5 and the output end of the second direct current bias unit respectively, and a second terminal of the resistor R6 is grounded; and an output voltage of the first power supply is equal to an output voltage of the second power supply, a resistance of the resistor R3 is equal to a resistance of the resistor R5, and a resistance of the resistor R4 is equal to a resistance of the resistor R6.

6. An audio signal adapter device, comprising a microphone, wherein the device further comprises an amplifying unit and a USB adapter interface, the microphone is configured to receive an audio signal and to output the audio signal via an audio pin of the microphone;

the amplifying unit comprises an audio input pin and an audio output pin, and is configured to amplify the audio signal received via the audio input pin and to output an amplified audio signal via the audio output pin;

the USB adapter interface is connected with an audio signal receiving device and comprises an audio signal pin;

the audio pin of the microphone is connected with the audio input pin of the amplifying unit, and the audio output pin of the amplifying unit is connected with the audio signal pin of the USB adapter interface;

the audio signal pin of the USB adapter interface is one of a D+ pin and a D− pin of the USB adapter interface;

wherein;

the microphone further includes a ground pin;

the amplifying unit further includes a ground pin;

the USB adapter interface further includes a reference signal pin;

the reference signal pin of the USB adapter interface is connected with the ground pin of the microphone and/or the ground pin of the amplifying unit; and the reference signal pin of the USB adapter interface is the other one of the D+ pin and the D− pin of the USB adapter interface.

* * * * *